United States Patent [19]

Yasukawa et al.

[11] Patent Number: 4,640,147
[45] Date of Patent: Feb. 3, 1987

[54] GEAR ASSEMBLY ADAPTED FOR MATING WITH A THIRD GEAR WITHOUT BACKLASH

[75] Inventors: Masao Yasukawa, Okazaki; Yukiyasu Taguchi, Toyota, both of Japan

[73] Assignee: Toyota Jidosha Kabushiki Kaisha, Toyota, Japan

[21] Appl. No.: 742,294

[22] Filed: Jun. 7, 1985

[30] Foreign Application Priority Data

Jun. 12, 1984 [JP] Japan ................. 59-86061[U]

[51] Int. Cl.$^4$ ............................................. F16H 55/18
[52] U.S. Cl. ............................................. 74/409; 74/440
[58] Field of Search ........................... 74/409, 440, 441

[56] References Cited

U.S. PATENT DOCUMENTS

| | | | |
|---|---|---|---|
| 1,197,261 | 9/1916 | Burke | 74/440 |
| 1,539,149 | 5/1925 | Thornburg | 74/440 |
| 1,608,050 | 11/1926 | Bailey | 74/440 |
| 1,724,518 | 8/1929 | Ruf | 74/440 |
| 2,663,198 | 12/1953 | Cairnes | 74/409 |
| 3,009,366 | 11/1961 | Roberts | 74/409 |
| 3,011,358 | 12/1961 | Moore | 74/409 |
| 3,365,723 | 1/1968 | Spormann | 74/409 |
| 3,365,973 | 1/1968 | Henden | 74/409 |
| 3,396,594 | 8/1968 | Walker | 74/409 |
| 4,137,181 | 6/1964 | Guilbert | 74/409 |
| 4,407,544 | 10/1983 | Bähring | 74/440 |

FOREIGN PATENT DOCUMENTS

| | | |
|---|---|---|
| 889094 | 9/1953 | Fed. Rep. of Germany . |
| 1625596 | 7/1970 | Fed. Rep. of Germany . |
| 2520828 | 5/1983 | France . |
| 48-2947 | 1/1973 | Japan . |
| 48-34438 | 10/1973 | Japan . |
| 55-158349 | 5/1979 | Japan . |
| 56-160351 | 4/1980 | Japan . |

OTHER PUBLICATIONS

"18 Ways to Control Backlash in Gearing" *Product Engineering* Oct. 26, 1959, pp. 71-75.

*Primary Examiner*—Allan D. Herrmann
*Attorney, Agent, or Firm*—Kenyon & Kenyon

[57] ABSTRACT

A gear assembly comprising two gears and a spring in the form of a C-shaped clip interconnecting the two gears. Two pins are provided on one of the two gears and the spring has two holes, one in each end thereof, whereby the spring can be carried by one gear in a pretressed state by means of the pin-and-hole connection. The other gear has a groove to cover the spring, thus the assembly work can be accomplished simply by resting the second gear to the first gear. An end wall of the groove engages with an end of the spring to create a spring force necessary to provide non-backlash mating with a third gear.

6 Claims, 6 Drawing Figures

GEAR ASSEMBLY ADAPTED FOR MATING WITH A THIRD GEAR WITHOUT BACKLASH

BACKGROUND OF THE INVENTION

1. Field of the Invention

The present invention relates to a gear assembly which constitutes a single gear to be mated with a third gear to eliminate backlash therebetween, for reducing noise caused by mated gears. The present invention can be widely applied in a variety of mechanical fields.

2. Description of the Related Art

A conventional non-backlash gear assembly is known in which the assembly comprises two gears and a spring, each end of which is anchored to the respective gears to provide a circumferential force that will cause the two gears to rotate in opposite directions, so that this gear assembly can be mated with a third gear in a non-backlash manner.

Several types of springs are used for biasing the two gears. For example, a compression coil spring is used in the device shown in FIG. 2 of Japanese Examined Utility Model Publication (Kokoku) No. 48-34438 and in FIG. 1 of Japanese Unexamined Utility Model Publication (Kokai) No. 55-158349. A torsional coil spring is used in Japanese Unexamined Utility Model Publication (Kokai) No. 56-160351, and a C-shaped round steel spring is used in FIG. 1 of Japanese Examined Utility Model Publication (Kokoku) No. 48-34438 and in FIG. 3 of Japanese Unexamined Utility Model Publication (Kokai) No. 55-158349. Further, a hairpin shaped spring is used in Japanese Examined Utility Model Publication (Kokoku) Nos. 48-34438 and 48-2947.

In a known non-backlash gear assembly including a spring in the form of a C-shaped clip, two circular holes are provided in the spring adjacent to either end thereof and each of the two gears has one pin. Thus each end of the spring can be connected to each gear by the pin and circular hole. This known type of gear assembly has a disadvantage in that assembly is difficult. Namely, it is very cumbersome to fit the holes to the pins, as shown below. In the first step the spring is rested on the first gear, and the circular hole of one end of the spring is fitted to the pin on the first gear. This is very easy since both the first gear and the spring can be seen by the operator. In the second step, however, the second gear must be moved onto the first gear, to fit the pin on the second gear into the other hole of the spring. This is very cumbersome since the first gear, the spring and the other pin of the second gear cannot be seen because they are blocked by the second gear, and the operator must fit the other hole to the other pin by touch.

SUMMARY OF THE INVENTION

It is an object of the present invention to provide a gear assembly adapted for mating with a third gear in a non-backlash manner, which can be easily assembled.

According to the present invention, there is provided a gear assembly adapted for mating with a third gear in a non-backlash manner, the assembly comprising: first and second gears arranged so as to be coaxially and relatively rotatable, the two gears having teeth with an identical tooth profile on their peripheries and having inner surfaces opposing each other; two pin means standing on the inner surface of the first gear; a spring having a generally circular arcuate shape and having two hole means adjacent to either end thereof, this spring being carried by the first gear in a prestressed state by the pin means engaged with the hole means at each end of the spring, at least one of the hole means having a dimension, taken circumferentially of the assembly, greater than that of the associated pin means so that the spring can be elastically deformed by the application of a force to the spring at the end thereof adjacent to said associated pin means; and a wall means on the inner surface of the second gear for defining a groove to cover the spring at least partly in the axial direction of the assembly, a part of the wall means abutting against one end of the spring to cause an elastic deformation to the spring, the first and second gears together being adapted to mate with the common third gear under the elastic deformation of the spring, to provide a non-backlash engagement with the third gear.

Assembly of the above-stated gear assembly, according to the present invention, can be easily completed by resting the spring onto the first gear and then resting the second gear onto the first gear. As the two pins are provided only on the first gear, according to the present invention, the holes can be fitted to the pins visually. As the spring is carried under a predetermined prestress between the two fixed pins, a necessary spring force is provided without the need to adjust the rotational relationship between the two gears, thus obtaining a clamping force which will provide a non-backlash mating with the third gear.

Further features and advantages of the present invention will be described in greater detail in connection with a preferred embodiment of the invention and in reference to the attached drawings.

DETAILED DESCRIPTION OF THE PREFER EMBODIMENT

Figure 1:
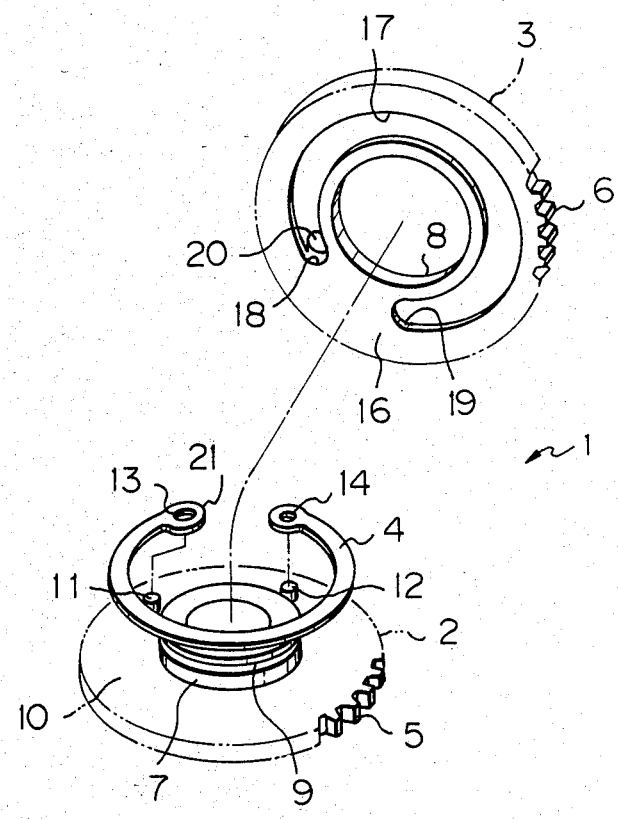
FIG. 1 is an exploded perspective view of the gear assembly according to the present invention.
Figure 6:
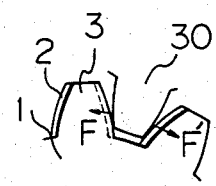
FIG. 6 illustrates the teeth of the gears of the assembly in FIG. 5, and a tooth of a third gear.

In FIG. 1, a non-backlash gear assembly according to the present invention is generally indicated by the reference numeral 1. This assembly 1 comprises a first main gear 2, a second subgear 3, and a spring 4 in the form of C-shaped clip. The gear assembly 1 as a whole constitutes a single gear means which can be mated with a third gear 30, as shown in FIG. 6. The first gear 2 and the second gear 3 have conventional teeth 5 and 6 on their peripheries, respectively. The tooth profile and the number of the teeth 5 and 6 of each gear 2 and 3 are identical. The spring 4 has a shape such as is known as a retaining ring or a snap ring and comprises a flat and generally circular arcuate shape.

The first gear 2 has a cylindrical boss 7 at the central region thereof, to fit the first gear 2 onto a desired shaft. The boss 7 projects coaxially from the first gear 2, the internal peripheral surface 8 of the second gear 3 being slidably fitted onto the external peripheral surface of the first gear 2. Thus the first gear 2 and the second gear 3 can be arranged so as to be coaxially and relatively rotatable.

An annular groove 9 is provided near the free end of the boss 7 for receiving a snap ring (not shown) to retain the second gear 3 on the first gear 2 in the axial direction.

The first gear 2 has an inner surface 10 on the side from which the boss 7 projects and the second gear 3 has an inner surface 16, these surfaces 10 and 16 oppose each other when the second gear 3 is fitted to the boss 7 of the first gear 2.

Figure 2:
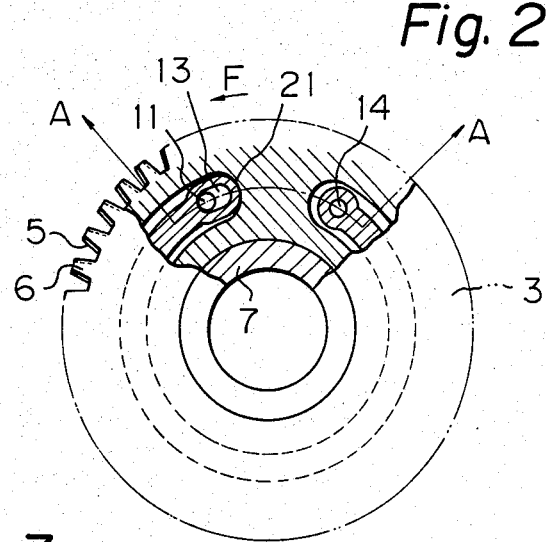
FIG. 2 is a plan view, partly sectional, of the gear assembly of FIG. 1.
Figure 3:
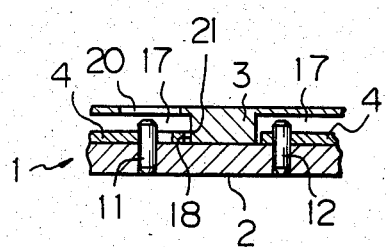
FIG. 3 is a section taken along the lines A—A in FIG. 2, illustrating the assembly in a free condition.

Two pins 11 and 12 are provided on the inner surface 10 of the first gear 2. The spring 4 in the form of a C-shaped clip has two holes 13 and 14 adjacent to either end thereof. The spring 4 can be carried by or rested on the first gear 2 in a prestressed state, namely, in an expanded condition relative to its free initial configuration, with the pins 11 and 12 engaged with the holes 13 and 14 of the spring 4. In this embodiment, the spring 4 and the pins 11 and 12 are designed in such a manner that the spring 4 is substantially concentrically arranged around the boss 7, as clearly shown in FIG. 2. Further, the hole 13 is an elongated hole, the longer dimension of which extends circumferentially of the spring 4, i.e., circumferentially of the assembly, and the other hole 14 is a circular hole, the diameter of which substantially conforms to the pin 12. Accordingly, the pin 11 can abut against the circumferentially inner wall of the hole 13, as shown in FIGS. 2 and 3, when an external force is not applied to the assembly after the spring 4 is mounted on the first gear 2. When an external force is applied to the spring 4 in the counterclockwise direction as represented by the arrow F in FIG. 2, the spring 4 elastically deforms within the limit determined by the difference between the dimensions of the hole 13 and the pin 11. As the spring 4 is fixed at the other end by engaging the pin 12 with the hole 14, such elastic deformation of the spring 4 provides a reaction force to that external force. It will be clear from the above description that this reaction force will allow the assembly to mate with the third gear 30 in a non-backlash manner.

Figure 5:
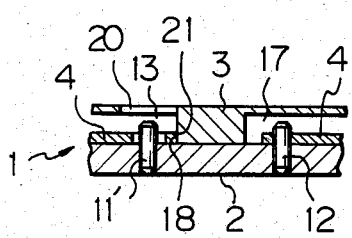
FIG. 5 is a section similar to FIG. 3, illustrating the assembly in a spring biased condition.

The second gear 3 has a circular arcuate groove 17, concentrically recessed on its inner surface 16, which opposes the inner surface 10 of the first gear 2 when the assembly is completed. The length of the groove 17 is slightly greater than that of the spring 4, and the width of the groove is such that the groove 17 can accomodate the spring 4 both when the spring 4 is free from the external force, as shown in FIGS. 2 and 3, and when the spring 4 is fully deformed by the external force, as shown in FIG. 5, in which position the spring 4 may be radially expanded from the free position. The groove 17 preferably has a depth which will allow the groove 17 to fully cover the spring 4 until the inner surfaces 10 and 16 of the first and second gears 2 and 3 are in contact with each other. Alternatively, the groove 17 may have a depth which will allow the groove 17 to partly cover the spring 4 where the two inner surfaces 10 and 16 are not in contact with each other. It is important that a part of the wall which defines the groove 17 engages with the end 21 of spring 4 having the elongated hole 13 provided therein.

The groove 17 is constituted by a wall perpendicular to the inner surface 16 of the second gear 3, the wall including the rounded end walls 18 and 19. It will be clear, in this embodiment, that the end wall 18 is designed to abut against the end 21 of the spring 4. Further, the second gear 3 has a through aperture 20 near the end wall 18 to permit visual observation of the spring 4 from behind the second gear 3 when or after the second gear 3 is rested on the first gear 2. As can be clearly understood from the above, the assembly work can be easily carried out by mounting the spring 4 to the first gear 2 and simply superimposing the second gear 3 onto the first gear 2. There is no need to attempt to fit the spring 4 and pins 11 and 12 by touch from behind the second gear 3. Thus, the present invention is very advantageous as compared to a conventional non-backlash gear assembly in which, for example, one of the pins, e.g., pin 11, is mounted on the second gear 3. In such a conventional gear assembly, the hole 14 of the spring 4 is first engaged with the pin 12 of the first gear 2, then the other hole 13 of the spring 4 must be engaged with the pin 11 of the second gear 3. During such work, the pin 11 and the hole 13 cannot be seen by the operator, since they are behind the second gear 3 and optional movement of the second gear 3 is restricted by the boss 7 to which the second gear 3 is fitted. Thus such work is very difficult. It will be further apparent that, in such a conventional gear assembly, the position of the pins 11 and 12 are rotationally free from each other so that the rotational relationship between the first and the second gears 2 and 3 must be adjusted to provide a necessary spring force for obtaining a non-backlash condition when the non-backlash gear assembly is mated with the third gear 30. The present invention enables easy assembly work and eliminates such rotational adjustment of the gears.

Figure 4:
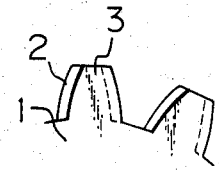
FIG. 4 illustrates the teeth of the gears of the assembly in FIG. 3.

FIG. 3 shows the gear assembly, taken along the lines A—A in FIG. 2, in a condition where the gear assembly is not yet mated with the third gear, as shown in FIG. 4. It can be seen from FIG. 3 that the circumferential length of the groove 17 is slightly greater than that of the spring 4 when it is carried by the first gear 2, thus the second gear 3 is free from the spring 4 within a predetermined amount of play. This play, namely, the difference between the circumferential lengths of the spring 4 and the groove 17, is preferably less than the distance between the adjacent teeth of the first or the second gears 2 and 3. Thus each tooth of the second gear 3 is superimposed on each tooth of the first gear 2 with a slight displacement therebetween and a gap is present between adjacent sets of superimposed teeth, as shown in FIG. 4.

When the gear assembly is mated to the third gear 30, each tooth of the third gear 30 can be forced into that gap between the adjacent sets of superimposed teeth of the gear assembly, with the result that the teeth of the third gear 30 push the teeth of the second gear in the counterclockwise direction, as shown in FIG. 6, causing the end wall 18 of the groove 17 of the second gear 3 to push against the end 21 of the spring 4. The spring 4 then elastically deforms and the wall of the hole 13 is released from the pin 11. The spring 4, therefore, effects a reaction force to the second gear 3, as indicated by the arrow F. As the second gear 3 is freely rotatable relative to the first gear 2, the teeth of the second gear 3 are always in contact with the teeth of the third gear 30, so that each tooth of the third gear 30 is clamped between each tooth of the first gear 2 and each tooth of the second gear 3, even when backlash is provided between the first gear 2 and the third gear 30. Thus non-backlash mating is accomplished and noise is reduced.

It is obvious that various modifications can be made to the present invention without departing from the spirit and the scope of the present invention. For example, only one hole 13 is an elongated hole in the above-described embodiment, but the other hole 14 can also be elongated if desired. Further it is obvious that the hole means can include means for engaging or securing the spring with the pin, such as a hole partly encircled by a hook.

We claim:

1. A gear assembly adapted for mating with a third gear in a non-backlash manner, said assembly comprising:

first and second circular gears arranged so as to be coaxially and relatively rotatable, said gears having peripheral teeth with identical tooth profiles and having inner surfaces opposing each other;

first and second pin means standing on the inner surface of the first gear;

a spring having a generally arcuate shape with first and second ends and having first and second hole means adjacent to the respective ends thereof, said spring being carried by said first gear in a pre-stressed state by said first and second pin means engaged with said respective first and second hole means at each end of the spring, at least said first hole means having a dimension, taken circumferentially of the assembly, greater than that of the associated first pin means so that said spring can be elastically deformed by application of a force to said spring at the first end thereof; and a wall means on the inner surface of said second gear for defining a groove to cover said spring at least partly in the axial direction of the assembly, a part of said wall means abutting against said one end of said spring to cause elastic deformation to said spring, said first and second gears together being adapted to mate with the common third gear under the elastic deformation of said spring to provide non-backlash mating with said third gear.

2. An assembly according to claim 1, wherein said at least first hole means is an elongated hole, the longer dimension of which extends circumferentially of the assembly.

3. An assembly according to claim 1, wherein said groove is of a generally circular arcuate shape substantially conforming to but of greater circumferential length than said spring, and said part of said wall means is an end wall of said arcuate groove.

4. An assembly according to claim 3, wherein the difference between the circumferential length of said groove and the circumferential length of said spring is less than the distance between adjacent teeth of the first gear.

5. An assembly according to claim 1, wherein said second gear further has a through aperture through which said spring can be seen from behind the second gear.

6. An assembly according to claim 1, wherein said first gear has a central boss projecting from said inner surface thereof, said second gear being movably supported on said boss.

* * * * *